United States Patent
Krahe et al.

[15] 3,687,406
[45] Aug. 29, 1972

[54] PIPE HANGER

[72] Inventors: Paul J. Krahe, 3015 Greengarden Boulevard, Erie, Pa. 16508; Harry Gannon, 531 W. Gore Road, Erie, Pa. 16509

[22] Filed: Aug. 3, 1970

[21] Appl. No.: 60,281

[52] U.S. Cl. .................248/55, 248/59, 248/72, 248/68 R, 248/226 E
[51] Int. Cl. .................................F16l 3/16
[58] Field of Search.......248/55, 68 R, 72, 59, 226 E, 248/125, 410

[56] References Cited

UNITED STATES PATENTS

| | | |
|---|---|---|
| 1,561,850 | 11/1925 | Guttman.....................248/55 |
| 2,641,428 | 6/1953 | Kirk............................248/55 |
| 1,056,028 | 3/1913 | Kehm.........................248/55 |
| 3,321,161 | 5/1967 | Hirt............................248/72 |
| 2,930,156 | 3/1960 | Jones..................248/226 E X |
| 3,494,583 | 2/1970 | Parr....................248/226 E X |
| 2,577,319 | 12/1951 | Feitl...........................85/36 |
| 3,415,473 | 12/1968 | Ollen.........................248/59 |

*Primary Examiner*—Chancellor E. Harris
*Attorney*—Charles L. Lovercheck

[57] ABSTRACT

The specification discloses a hanger for supporting at least two parallel pipes. The hanger is made of a generally W-shaped rod with ends parallel to each other attached to the W-shape. The ends are provided with fasteners for receiving clamps for supporting the hanger to a ceiling. Round rollers are disposed on the intermediate parts of the hanger to engage the pipe and to freely support it for longitudinal movement.

6 Claims, 4 Drawing Figures

Patented Aug. 29, 1972 3,687,406

INVENTORS
Paul J. Krahl
and
Harry Dannar

PIPE HANGER

STATEMENT OF INVENTION

This invention relates to and, more particularly, to hangers for pipe, rods and the like.

OBJECTS OF THE INVENTION

It is an object of the invention to provide an improved hanger for pipe.

Another object of the invention is to provide a hanger for pipe which is simple in construction, economical to manufacture, and simple and efficient to use.

Another object of the invention is to provide a hanger for two or more parallel pipes, the hanger being W-shaped and having two generally parallel ends with clamps for attaching the ends to a structural member of a building.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
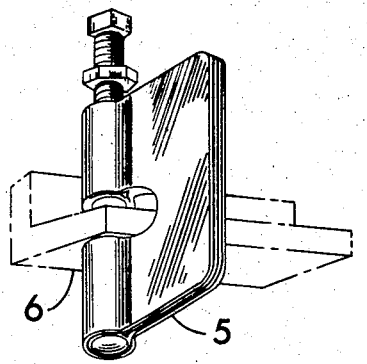
FIG. 1 is a perspective view of a C clamp attached to a structural steel member of a building.

Now with more particular reference to the drawings, a C clamp 5 is shown in FIG. 1 which could be attached to each of the threaded ends 9 of the hanger rod 8. The C clamp could be attached to a structural building member 6 or some similar member. Some other hanger means could be provided for supporting the hanger rod. The two ends of the rod indicated at 18 are parallel to each other and the rod is bent at 14, 15 and 16 to form a W-shape so that the pipes 12 and 13 may be supported on the rollers 11. The rollers 11 are in the form of annular members and they are held in place by means of the retaining washers 10. The retaining washers 10 are of a type familiar to those skilled in the art and have a lip 17 which grips the rod 8 and prevents the washers from sliding. In the example shown, six of the rollers 11 are shown at each leg of the W-shaped intermediate part. A different number and different thicknesses of rollers could be used for different sizes of pipe and the number of rollers form no part of this invention.

The rollers 11 are freely rotatable on the rod 8 so that the pipes 12 and 13 can move freely in a longitudinal direction to account for thermal expansion and other movement.

Figure 2:
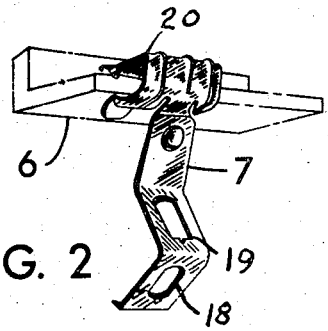
FIG. 2 is a perspective view of a spring clamp attached to a structural steel member of a building.
Figure 3:
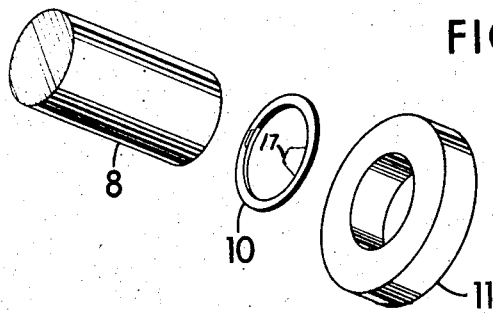
FIG. 3 is an exploded perspective view of rod retaining washers and roller according to the invention.
Figure 4:
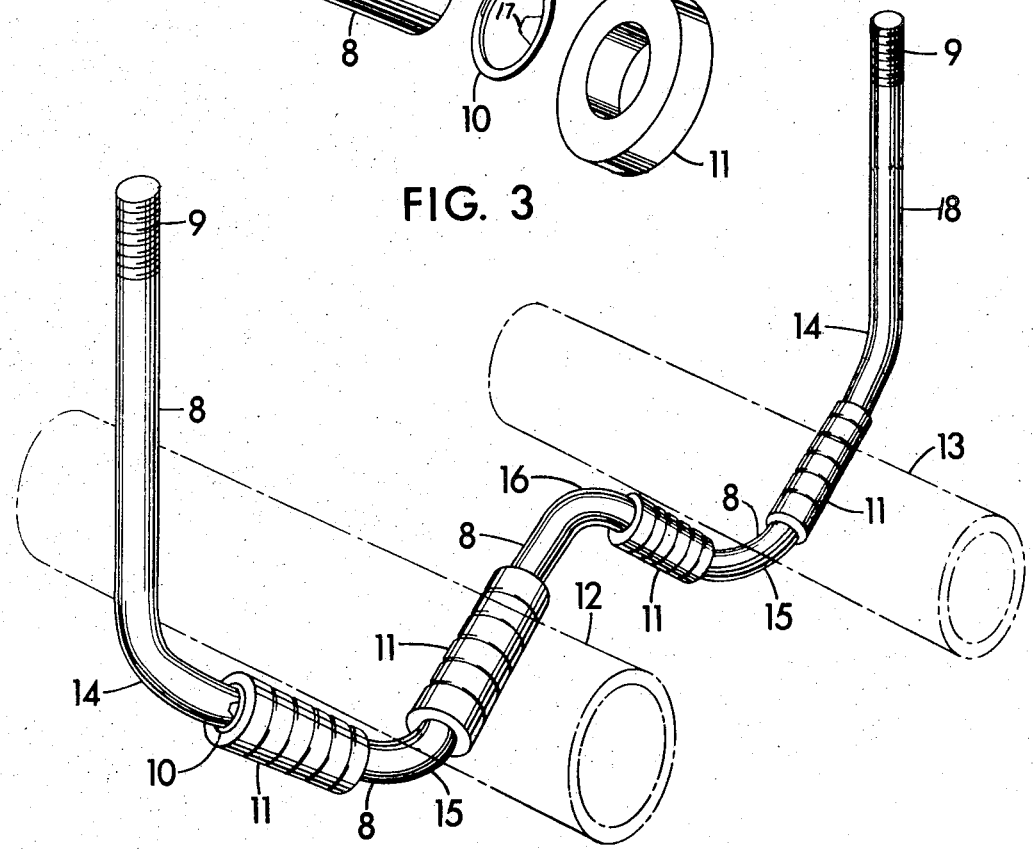
FIG. 4 is a perspective view of a pipe hanger supporting two pipes.

The clamp 7 shown in FIG. 2 is of a type familiar to those skilled in the art and is made of a piece of spring steel bent into a generally Z-shape and having the oblong openings 18 and 19 into which the threaded ends 9 of the hanger are received. The clamp 7 has the C-shaped portion 20 which receives the flange of the structural building member 6, such as an I-beam, a T-shape or angle.

The foregoing specification sets for the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A hanger comprising
   two generally parallel legs and an intermediate part connecting said legs, all made of a single continuous integral rodlike member generally round in cross section,
   clamp means for attaching each of said legs to a support with said legs extending downwardly,
   and means on said intermediate part to engage at least two spaced elongated horizontally extending members whereby said horizontally extending members are supported and allowed to move freely longitudinally,
   said clamp means comprising a spring clamp bent into a Z-shape and having a slot means engaging a threaded end of said legs and means on said clamp for receiving a structural member of a building.

2. The hanger recited in claim 1 wherein said hanger member is made of a round rod and said clamp means to support said rod comprises a C clamp, and threaded ends on said rod for threadably engaging said C clamp, said C clamp being adapted to be attached to the structural steel of a building.

3. The hanger recited in claim 1 wherein said intermediate part of said rod is formed into a W-shape,
   and four sets of said rollers are disposed on said W-shaped part,
   and a spring washer is placed on said leg at each end of each said set of rollers,
   and means is provided to hold said spring washer in place.

4. A hanger comprising
   two generally parallel legs and an intermediate part connecting said legs, all made of a single continuous integral rodlike member generally round in cross section,
   clamp means for attaching each of said legs to a support with said legs extending downwardly,
   and means on said intermediate part to engage at least two spaced elongated horizontally extending members whereby said horizontally extending members are supported and allowed to move freely longitudinally,
   said hanger member being made of a round rod and said clamp means to support said rod comprises a C clamp, and threaded ends on said rod for threadably engaging said C clamp,
   said C clamp being adapted to be attached to the structural steel of a building,
   said means on said intermediate part of said hanger comprises a plurality of roller members freely rotatably received on said rod and rotatable thereon, and means to hold said roller members in place whereby said roller members are adapted to receive two spaced pipes, said ends of said hanger being generally parallel to each other, and the said intermediate part of said hanger between said ends is in the form of a W, and four sets of said rollers are disposed on said W-shaped parts for engaging two pipes.

5. The hanger recited in claim 1 wherein said hanger comprises a generally W-shaped integral continuous round rod having ends attached to said W-shaped rod and the said ends extending generally parallel to each other, rollers on said W-shaped rod for engaging two spaced pipes.

6. A hanger made of a round continuous integral rod having generally parallel ends formed into the shape generally of a W, and means for attaching said ends to a building, said ends being attached to said W having first legs extending downward and toward each other and second legs extending upward and toward each other whereby two U-shaped portions are provided, roller means on each said legs for engaging two spaced pipes to be supported.

* * * * *